(12) United States Patent
Yagisawa et al.

(10) Patent No.: US 7,353,406 B2
(45) Date of Patent: Apr. 1, 2008

(54) DISK ARRAY OPTIMIZING THE DRIVE OPERATION TIME

(75) Inventors: Ikuya Yagisawa, Tokyo (JP); Naoto Matsunami, Hayama (JP); Akihiro Mannen, Yokohama (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 405 days.

(21) Appl. No.: 10/777,832

(22) Filed: Feb. 11, 2004

(65) Prior Publication Data

US 2005/0111249 A1 May 26, 2005

(30) Foreign Application Priority Data

Nov. 26, 2003 (JP) .............................. 2003-394919

(51) Int. Cl.
G06F 1/00 (2006.01)
G06F 12/00 (2006.01)
(52) U.S. Cl. .................. 713/300; 713/323; 711/114
(58) Field of Classification Search ................ 713/300, 713/320, 323; 711/112, 114
See application file for complete search history.

(56) References Cited

U.S. PATENT DOCUMENTS

| | | |
|---|---|---|
| 4,980,836 A | 12/1990 | Carter et al. |
| 5,361,364 A | 11/1994 | Nagashige et al. |
| 5,423,046 A | 6/1995 | Nunnelley et al. |
| 5,461,266 A | 10/1995 | Koreeda et al. |
| 5,471,099 A | 11/1995 | Larabell et al. |
| 5,481,733 A | 1/1996 | Douglis et al. |
| 5,637,932 A | 6/1997 | Korceeda et al. |
| 5,691,948 A | 11/1997 | Sakabe |
| 5,734,912 A | 3/1998 | Okuno et al. |
| 5,790,773 A | 8/1998 | DeKoning et al. |
| 5,809,316 A | 9/1998 | Gouzu |
| 5,828,568 A | 10/1998 | Sunakawa et al. |
| 5,875,063 A | 2/1999 | Corrington et al. |

(Continued)

FOREIGN PATENT DOCUMENTS

JP 07-302138 11/1995

(Continued)

OTHER PUBLICATIONS

Rachad Youssef, RAID for Mobile Computers, Aug. 1995, Carnegie Mellon University M.Sc. Dissertation, pp. 36.*

(Continued)

*Primary Examiner*—Suresh K Suryawanshi
(74) *Attorney, Agent, or Firm*—Townsend and Townsend and Crew LLP (57) ABSTRACT

In accordance with one embodiment of the invention, a storage system is configured as at least one logical unit including at least one disk device; a controller for executing a read processing or a write processing of data having been stored or to be stored in the logical unit which is a destination of a read request or a write request, in response to the read request or write request transmitted from the computer, wherein the controller receives an instruction from the computer to turn on or off a disk device corresponding to the logical unit; and wherein, based on the instruction, the storage system turns on or off the disk device corresponding to the logical unit independently of disk devices corresponding to the other logical units.

12 Claims, 8 Drawing Sheets

U.S. PATENT DOCUMENTS

| | | | |
|---|---|---|---|
| 5,875,120 A | 2/1999 | Matsushima et al. | |
| 5,884,087 A | 3/1999 | White et al. | |
| 5,900,007 A | 5/1999 | Nunnelley et al. | |
| 5,918,059 A | 6/1999 | Tavallaei et al. | |
| 5,926,404 A | 7/1999 | Zeller et al. | |
| 5,937,433 A | 8/1999 | Lee et al. | |
| 5,960,169 A | 9/1999 | Styczinski | |
| 5,964,878 A | 10/1999 | Ryu | |
| 6,052,791 A | 4/2000 | Chen et al. | |
| 6,057,974 A | 5/2000 | Sukigara et al. | |
| 6,192,481 B1 | 2/2001 | Deenadhayalan et al. | |
| 6,233,691 B1 | 5/2001 | Atkinson | |
| 6,272,591 B2 | 8/2001 | Grun | |
| 6,317,839 B1 | 11/2001 | Wells | |
| 6,332,175 B1 * | 12/2001 | Birrell et al. | 711/112 |
| 6,378,068 B1 | 4/2002 | Foster et al. | |
| 6,425,049 B1 | 7/2002 | Yamamoto et al. | |
| 6,512,652 B1 * | 1/2003 | Nelson et al. | 360/78.01 |
| 6,583,947 B1 | 6/2003 | Hakamata et al. | |
| 6,628,469 B1 | 9/2003 | Hoyt | |
| 6,826,005 B2 | 11/2004 | Hakamata et al. | |
| 7,035,972 B2 * | 4/2006 | Guha et al. | 711/114 |
| 2002/0034379 A1 | 3/2002 | Tanaka | |
| 2002/0038436 A1 | 3/2002 | Suzuki | |
| 2002/0062387 A1 | 5/2002 | Yatziv | |
| 2002/0144057 A1 * | 10/2002 | Li et al. | 711/112 |
| 2002/0199129 A1 | 12/2002 | Bohrer et al. | |
| 2003/0041283 A1 | 2/2003 | Murphy et al. | |
| 2003/0097493 A1 | 5/2003 | Weast | |
| 2003/0189811 A1 | 10/2003 | Peeke et al. | |
| 2003/0193732 A1 | 10/2003 | Hakamata et al. | |
| 2003/0193733 A1 | 10/2003 | Hakamata et al. | |
| 2003/0200473 A1 | 10/2003 | Fung | |
| 2003/0212859 A1 | 11/2003 | Ellis et al. | |
| 2003/0217300 A1 | 11/2003 | Fukumori et al. | |
| 2004/0054939 A1 | 3/2004 | Guha et al. | |
| 2004/0068670 A1 | 4/2004 | Suzuki et al. | |
| 2004/0068672 A1 * | 4/2004 | Fisk et al. | 713/323 |
| 2004/0148477 A1 | 7/2004 | Cochran | |
| 2004/0225903 A1 | 11/2004 | Hirezaki et al. | |
| 2004/0250148 A1 | 12/2004 | Tsirkel et al. | |
| 2005/0259345 A1 | 11/2005 | Hakamata et al. | |

FOREIGN PATENT DOCUMENTS

| | | |
|---|---|---|
| JP | 08-190762 | 7/1996 |
| JP | 09-251353 | 9/1997 |
| JP | 10-283123 | 10/1998 |
| JP | 11-203057 | 7/1999 |
| JP | 11-327811 | 11/1999 |
| JP | 2000-100054 A | 4/2000 |
| JP | 2000-293314 | 10/2000 |
| JP | 2002-297320 | 10/2002 |
| WO | WO 03/081416 | 10/2003 |

OTHER PUBLICATIONS

Patterson, D., et al., A Case for Redundant Arrays of Inexpensive Disks, Computer Science Division, Dept. of Electrical Engineering and Computer Sciences, University of California, Berkeley, CA.

Gurumurthi et al "Reducing Disk Power Consumption in Servers with DRPM," IEEE Computer 36:41-48 (Dec. 2003).

Gurumurthi et al "Interplay of Energy and Performance for Disk Arrays Running Transaction Processing Workloads," proceedings of the 2003 IEEE International Symposium on Performance Analysis of Systems and Software (2003 ISPASS), pp. 123-132, (Mar. 2003).

"Information Technology SCSI-3 Block Commands," T10 Project 996D, International Committee on Information Technology Standards (INCITS) (Jun. 1997).

* cited by examiner

| Disk No. | Disk type | Array configuration | LU No. | Snapshot pair | Snapshot status | Disk startup status | Accumulated time | Life setting |
|---|---|---|---|---|---|---|---|---|
| 0 | FC | (1)RAID5 | 261 | Original (1) | Non-mirror | ON | 10000hr | 40000hr |
| 1 | FC | (1)RAID5 | 261 | Original (1) | Non-mirror | ON | 10000hr | 40000hr |
| 2 | FC | (1)RAID5 | 261 | Original (1) | Non-mirror | ON | 10000hr | 40000hr |
| 3 | ATA | (2)RAID5 | 262 | Copy (1) | Non-mirror | OFF | 23000hr | 25000hr |
| 4 | ATA | (2)RAID5 | 262 | Copy (1) | Non-mirror | OFF | 23000hr | 25000hr |
| 5 | ATA | (2)RAID5 | 262 | Copy (1) | Non-mirror | OFF | 23000hr | 25000hr |

FIG.5

| LBA set number | Update bit |
|---|---|
| 0 | 0 |
| 1 | 1 |
| 2 | 0 |
| 3 | 0 |
| 4 | 0 |
| 5 | 0 |
| 6 | 0 |
| 7 | 0 |
| 8 | 0 |
| 9 | 0 |

| LU | LBA | Disk startup status |
|---|---|---|
| 0 | 1-10000 | OFF |
| 1 | 10001-30000 | ON |
| 2 | 30001-50000 | OFF |
|  |  |  |

FIG.11

DISK ARRAY OPTIMIZING THE DRIVE OPERATION TIME

BACKGROUND OF THE INVENTION

The present invention relates to an external storage device system. More specifically, the present invention relates to a technology for prolonging an operation period of a disk device (hereafter also referred to simply as a disk) and decreasing power consumption of a storage device system (hereafter referred to as a disk array). Here, the disk device's operation period signifies a period from the time to start using the disk device to the time when the disk device becomes unusable.

A disk array is a type of storage device systems connected to a computer. The disk array is also referred to as a RAID (Redundant Arrays of Inexpensive Disks) and constitutes a storage device system comprising a plurality of disk devices arranged in an array and a control section to control them. The disk array concurrently operates disk devices to accelerate read requests (requests to read data) and write requests (requests to write data) and to provide data with redundancy. Disk arrays are categorized into five levels depending on types of redundant data to be added and disk array configurations. This is described in non-patent document 1 (Daved A. Patterson, Garth Gibson, and Randy H. Katz, "A Case for Redundant Arrays of Inexpensive Disks (RAID)", Computer Science Division Department of Electrical Engineering and Computer Sciences, University of California Berkeley, 1988).

SUMMARY OF THE INVENTION

Some disk devices used for a disk array may shorten a total active time when they are turned on 24 hours a day in comparison to a case where the disk devices are turned on only when needed. The total active time, signifies the accumulated time during which the disk device is turned on. Such problem caused by deterioration and wear of parts constituting the disk devices. The disk device's total active time shortens when the disk device is turned on 24 hours a day and is operated continuously 24 hours a day. As a result, the disk device's operation period shortens. Such disk device is not suited for 24-hour continuous operations. The disk array capacity increases year after year. There is a trend of increasing the number of disk devices to be mounted. The power consumption for disk arrays tends to increase.

The present invention discloses a technology to prolong operation times of disk devices constituting a disk array. The present invention also discloses a technology to decrease the disk array's power consumption.

A computer accessing a disk array has a disk control instruction program which allows the disk array to turn on or off specific disk devices in it. The disk array has a disk power supply control instruction reception program and a disk power supply control circuit. The disk power supply control instruction reception program receives an instruction to turn on or off disk devices from the computer. The disk power supply control circuit turns on or off a disk device corresponding to an LU specified by the computer.

DETAILED DESCRIPTION OF THE PREFERRED EMBODIMENTS

Embodiments of the present invention will be described in further detail with reference to the accompanying drawings.

First Embodiment

The first embodiment will now be described.

(1) Description of the System Configuration

Figure 1:
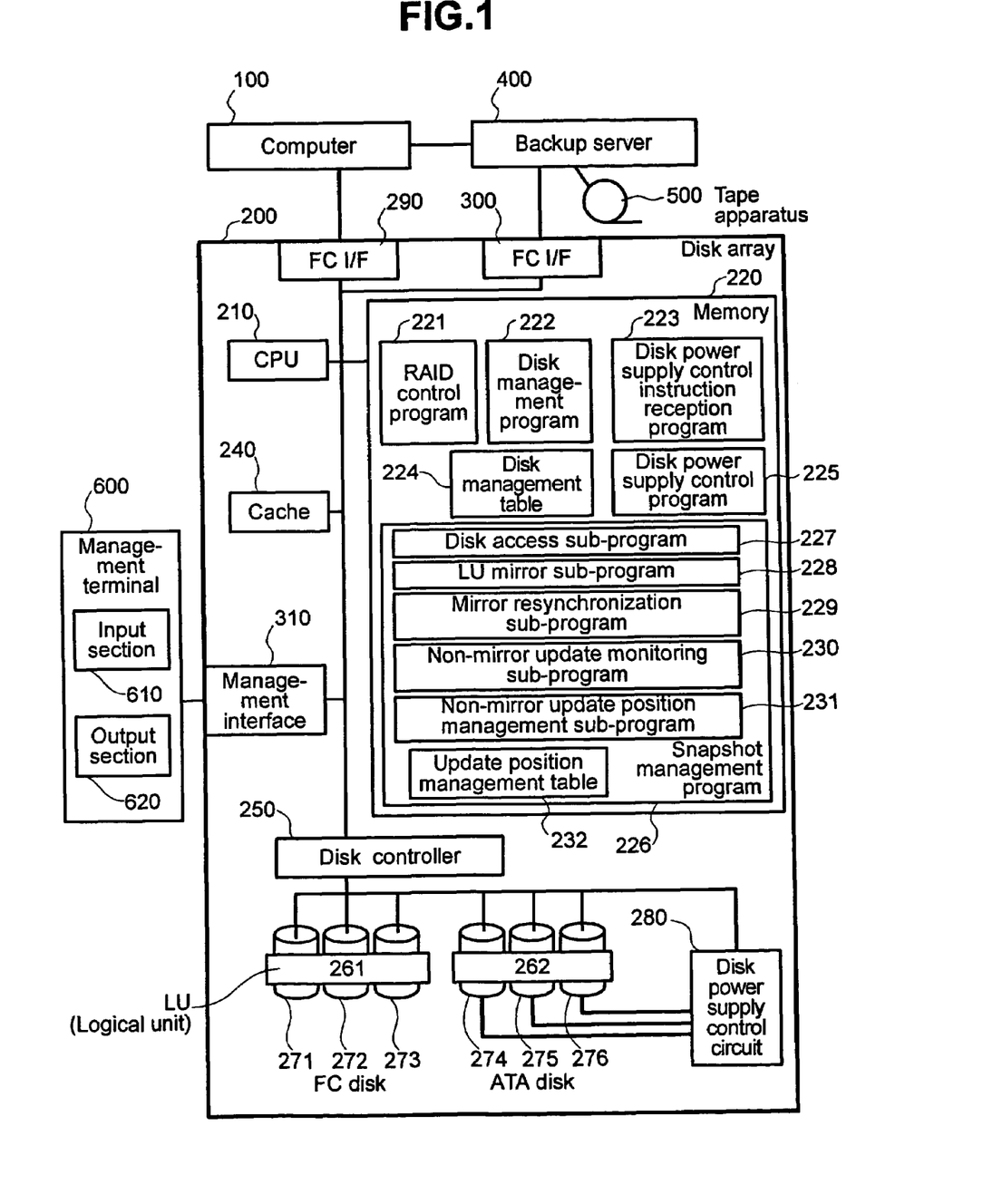
FIG. 1 shows an example of a system configuration according to a first embodiment.

FIG. 1 shows an example of the system configuration according to the first embodiment. In FIG. 1, a computer 100 is connected to a disk array 200 via a Fibre Channel interface (hereafter referred to as an FC I/F) 290 of the disk array 200. A backup server 400 is connected to the disk array 200 via an FC I/F 300 of the disk array 200. A tape apparatus 500 is connected to the backup server 400. A management terminal 600 is connected to the disk array 200 via a management I/F 310 of the disk array 200.

The disk array 200 comprises a CPU 210, memory 220, a cache 240, and a disk controller 250. The CPU 210 controls the disk array 200. The cache 240 stores user data of the disk array 200. The disk controller 250 controls a plurality of disk devices.

The disk controller 250 is connected to a plurality of FC disks 271 through 273 (hereafter referred to as an FC disk group) and a plurality of ATA disks 274 through 276 (hereafter referred to as an ATA disk group). The FC disk group and the ATA disk group each use a redundant configuration called RAID. The computer 100 accesses storage areas in the FC disks 271 through 273 as a SCSI logical unit (LU). Likewise, the computer 100 also accesses storage areas in the ATA disks 274 through 276 as a SCSI LU. An LU 261 represents the LU in the FC disks 271 through 273. An LU 262 represents the LU in the ATA disks 274 through 276. FIG. 1 illustrates the LU 261 and the LU 262 each as a storage area covering a plurality of disks. Further, the LU may comprise a storage area on one disk.

According to the embodiment, the snapshot management program 226 in the disk array 200 manages the LU 261 and the LU 262 duplicatively. When data is written to the LU 261 according to the embodiment, the snapshot management program 226 writes the same data to the LU 262 to duplicate the data. In this manner, storing the same data in the LU 261 and the LU 262 is referred to as mirroring data. The LU 261 contains original data and is referred to as a mirror origin LU. The LU 262 contains a copy of the original data and is referred to as a mirror destination LU. The LU 262 is used to obtain a snapshot. The snapshot is used to back up data on the tape apparatus.

A disk power supply control circuit 280 is connected to the ATA disks 274 through 276. The disk power supply control circuit 280 turns on or off each ATA disk independently of the other ATA disks. The disk power supply control circuit 280 is provided with registers corresponding to the ATA disks 274 through 276. Turning on or off the register turns on or off the corresponding ATA disk.

The following describes programs and management tables in the disk array 200.

The memory 220 of the disk array 200 contains a RAID control program 221, a disk management program 222, a disk power supply control instruction reception program 223, a disk management table 224, a disk power supply control program 225, and a snapshot management program 226. The RAID control program 221 controls the disk array 200. The disk management program 222 manages the FC disks 271 through 273 and the ATA disks 274 through 276. The disk management table 224 records operation parameters and operation states of the FC disks 271 through 273 and the ATA disks 274 through 276. The disk power supply control instruction reception program 223 receives an instruction to turn on or off disk devices from the computer 100. This instruction is hereafter referred to as a disk power supply control instruction. The disk power supply control program 225 turns on or off the ATA disks 274 through 276 based on instructions received from the computer 100. The snapshot management program 226 controls snapshots. According to the embodiment, a snapshot instruction program 127 to be described is contained in the computer 100 and issues instructions to delete or obtain snapshots. In addition, the snapshot instruction program 127 issues ModeSelect commands concerning disk power supply control instructions for the ATA disks 274 through 276. Accordingly, the snapshot management program 226 accepts not only instructions to delete or obtain snapshots, but also disk power supply control instructions for the ATA disks 274 through 276.

The snapshot management program 226 also contains a disk access sub-program 227 and an LU mirror sub-program 228. The disk access sub-program 227 instructs the disk controller 250 to access disks in accordance with requests from the computer 100. The LU mirror sub-program 228 applies an update to one LU and another predetermined LU and writes the same user data to two LUs. The LU mirror sub-program 228 duplicates data written to the LU 261 for the LU 262.

The snapshot management program 226 further contains a non-mirror update monitoring sub-program 230, a non-mirror update position management sub-program 231, and a mirror resynchronization sub-program 229. When the data duplication is inactivated between the LU 261 and the LU 262 (non-mirror state), the non-mirror update monitoring sub-program 230 detects an update to the mirror origin LU. The non-mirror update position management sub-program 231 records the update position in an update position management table 232 to be described later. When the mirror resynchronization is performed to restart data duplication between the LU 261 and the LU 262, the mirror resynchronization sub-program 229 copies the updated part of the mirror origin LU to the mirror destination LU.

The update position management table 232 is used to manage the contents of data stored in the mirror origin LU and the mirror destination LU. When data in the mirror origin LU is updated in the non-mirror mode, the update position management table 232 records the update position in the mirror origin LU.

Figure 5:
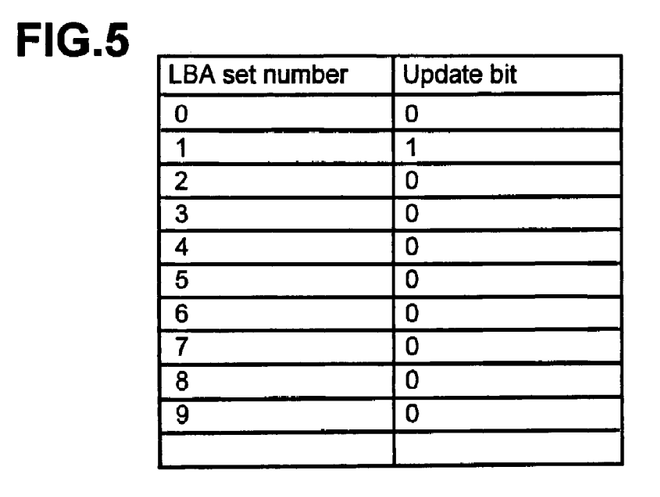
FIG. 5 shows an example of an update position management table according to the first embodiment.

For example, the update position management table 232 is a bit map as shown in FIG. 5 and lists LBA set numbers in the mirror origin LU and update bit states corresponding to the LBA set numbers. Each LBA set comprises one, or the same number of LBAs (Logical Block Addresses) that are used as a unit to divide the entire area in the LU from the beginning. The LBA sets are assigned LBA set numbers, i.e., sequence numbers, from the beginning.

The update bit indicates whether or not the LBA set corresponding to the update bit is updated in the non-mirror mode. The update bit is set to 1 when the LBA set is updated, or to 0 otherwise. The update bit is initially set to 0. For example, the update position management table 232 in FIG. 5 shows that only the area corresponding to LBA set number 1 is updated in the non-mirror mode.

Figure 4:
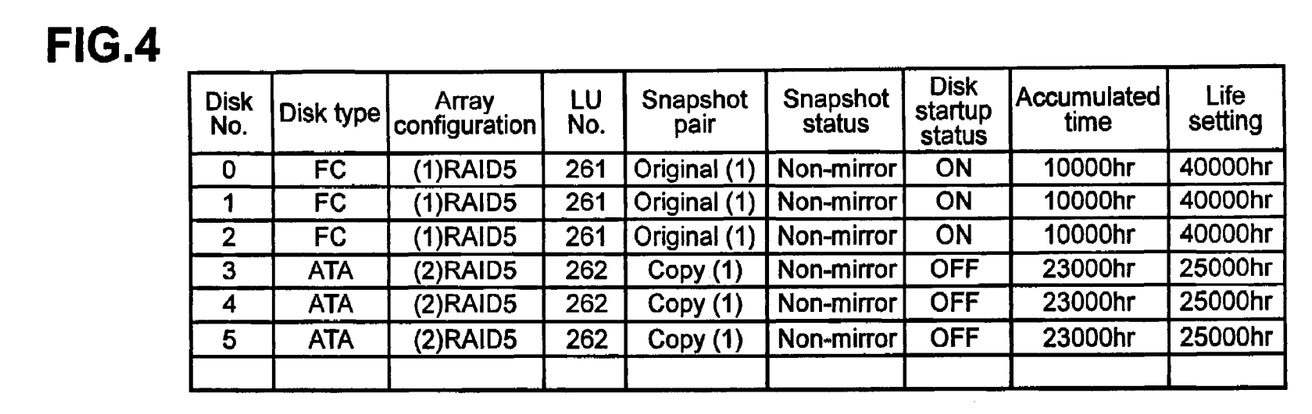
FIG. 4 shows an example of a disk management table according to the first embodiment.

Referring now to FIG. 4, an example of the disk management table 224 will now be described. The disk management table 224 comprises the following columns. The "disk No." column shows identification numbers of disk devices in the disk array 200. The "disk type" column shows the disk type, i.e., whether the disk device is an FC disk or an ATA disk. The "array configuration" column shows to which RAID group the disk device belongs. The "LU No." column shows to which LU the disk device belongs. The "snapshot pair" column shows whether data stored in the disk is original or copy. The "snapshot status" column shows whether or not data to be stored in an FC disk is mirrored to an ATA disk. The "disk startup status" column shows whether the disk device is turned on or off. The "accumulated time" column shows the accumulated time in which the disk device is turned on. The "life setting" column shows the limit of the accumulated time in which the disk device is turned on.

Returning now to FIG. 1, the management terminal 600 comprises an input section 610 and an output section 620. The input section 610 accepts settings for the FC disks 271 through 273 and the ATA disks 274 through 276 from a user. The output section 620 displays information about the FC disks 271 through 273 and the ATA disks 274 through 276 to the user.

The input section 610 inputs parameters to be assigned to the disk management table 224. The output section 620 outputs information recorded in the disk management table 224. The input section 610 represents a mouse, a keyboard, and the like. The output section 620 represents a display, an liquid crystal panel, a buzzer, and the like.

Figure 2:
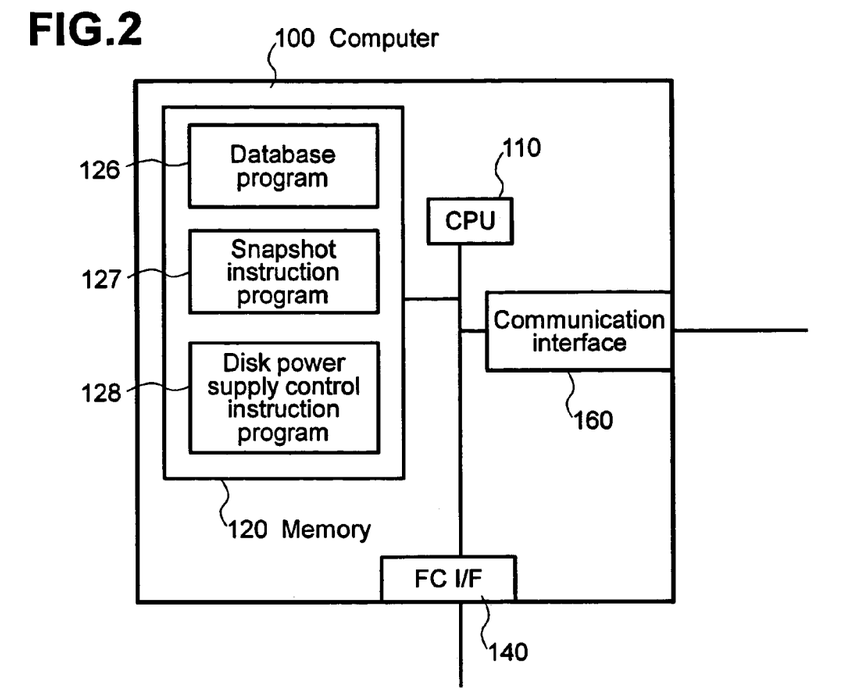
FIG. 2 shows an example of a computer configuration according to the first embodiment.

Referring now to FIG. 2, an example of the computer 100 will now be described. The computer 100 comprises a CPU 110, an FC I/F 140, a communication I/F 160, and memory 120. Th CPU 110 controls the computer 100. The I/F 140 connects the computer 100 to the disk array 200. The communication I/F 160 provides communication between the computer 100 and the backup server 400. The memory 120 stores programs.

The memory 120 stores a database program 126, a snapshot instruction program 127, and a disk power supply control instruction program 128. The snapshot instruction program 127 allows the disk array 200 to obtain snapshots. The disk power supply control instruction program 128 instructs to turn on or off disk devices in the disk array 200. The CPU 110 to control the computer 100 executes these programs. The snapshot instruction program 127 generates and issues SCSI ModeSelect commands. The ModeSelect commands include an instruction to turn on or off the ATA disks 274 through 276 from the disk power supply control instruction program 128 to the disk array 200. The Mode-Select commands also include an instruction to delete or obtain snapshots from the snapshot instruction program 127 to the disk array 200. The database program 126 accesses the LU 261, i.e., the mirror origin LU while the database is referenced or updated. The database program 126 also controls data update. The database program 126 stops accessing the disk array 200 at a check point that indicates a meaningful separation as database information. When data in the LU 261 becomes meaningful as database information, the database program 126 changes the disk array to a backup mode to back up that data. The backup mode ensures the consistency of data in the LU 261.

Figure 3:
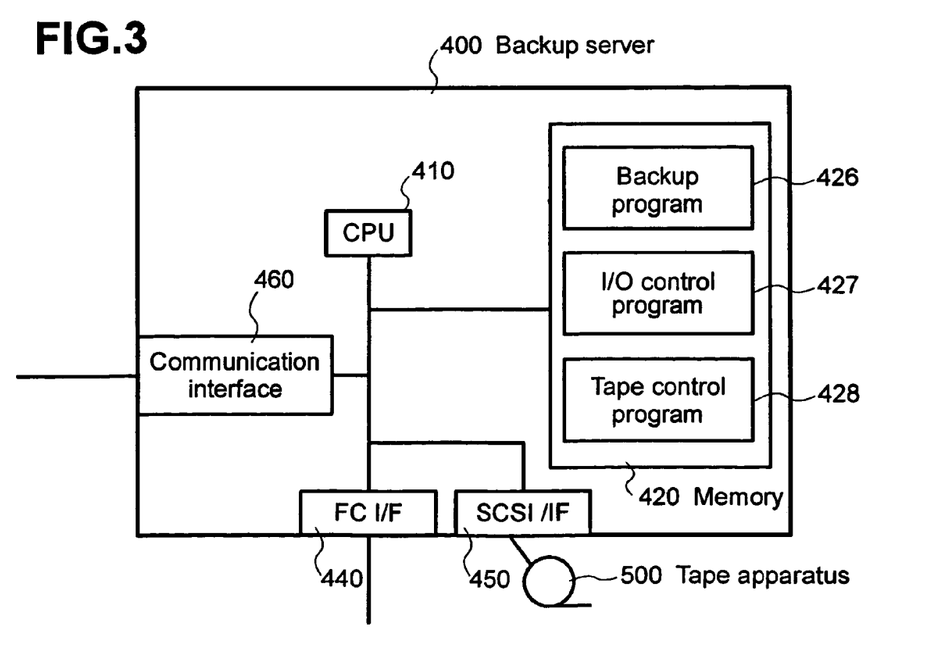
FIG. 3 shows an example of a backup server configuration according to the first embodiment.

Referring now to FIG. 3, an example of the backup server 400 will now be described. The backup server 400 comprises a CPU 410, an FC I/F 440, a communication I/F 460, a SCSI I/F 450, and memory 420. The CPU 410 controls the backup server 400. The FC I/F 440 connects the backup server 400 with the disk array 200. The communication interface 460 provides communication between the backup server 400 and the computer 100. The SCSI I/F 450 connects the backup server 400 with the tape apparatus. The memory 420 stores programs. The memory 420 stores a backup program 426, an I/O control program 427, and a tape control program 428. The backup program 426 backs up data in the disk array 200 onto the tape apparatus 500. The I/O control program 427 transfers data between the disk array 200 and the tape apparatus 500. The tape control program 428 control the tape apparatus 500. The CPU 410 to control the backup server 400 executes these programs.

There has been described the system configuration of the embodiment.

(2) Obtaining and Deleting Snapshots

Figure 6:
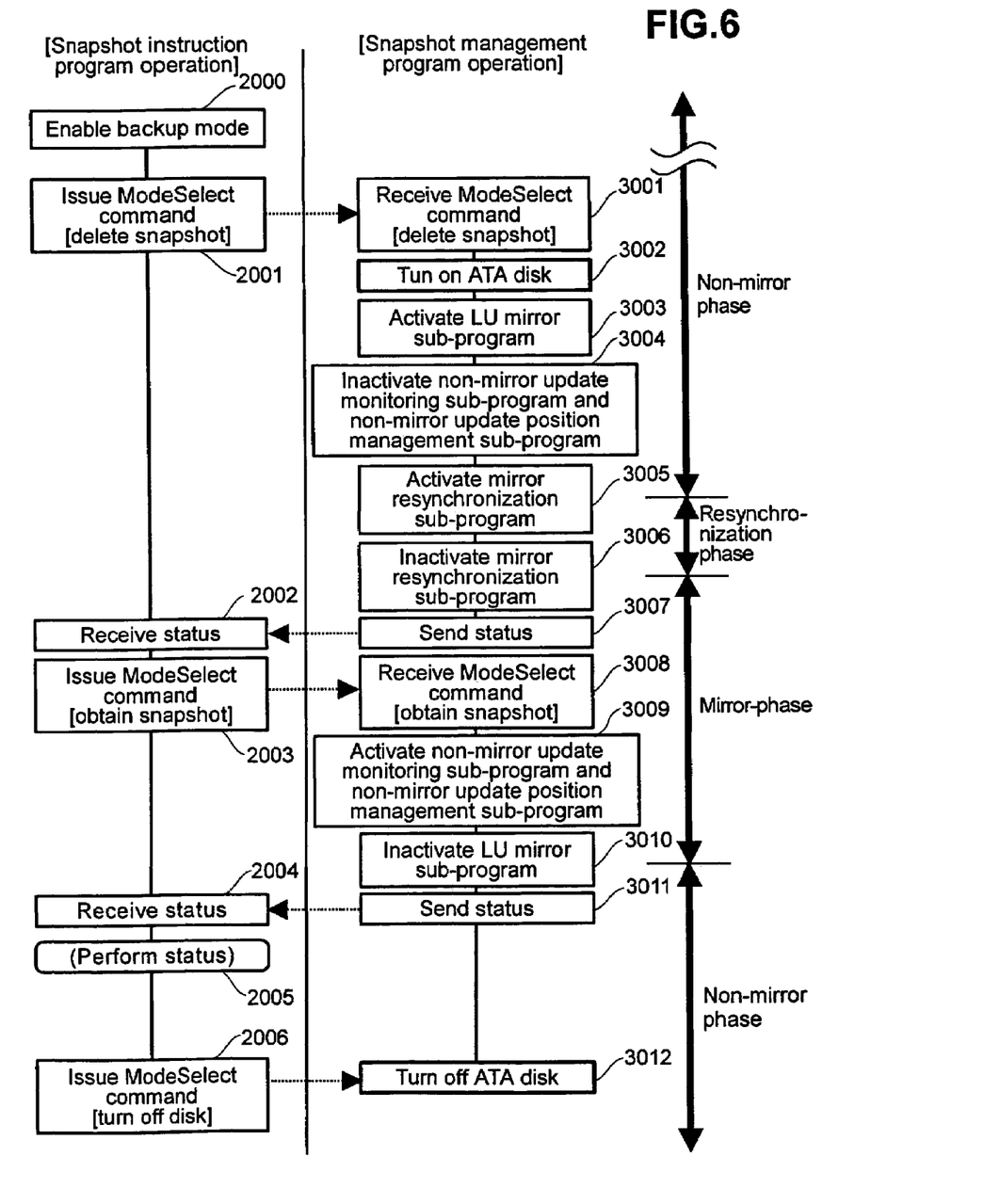
FIG. 6 shows an example of obtaining or deleting a snapshot according to the first embodiment.

With reference to the flowchart in FIG. 6, the following describes an example of processes performed by the snapshot instruction program 127 and the snapshot management program 226 when snapshots are obtained or deleted. The embodiment assumes that the disk array 200 obtains a snapshot of the LU 261 in synchronization with the timing when the backup server 400 backs up data. It also assumes to turn on the ATA disks 274 through 276 for the LU 262 only during a period in which a snapshot is obtained and data is backed up from mirror destination LU.

Since the LU 262 stores data of the previously obtained snapshot, the snapshot instruction program 127 running on the computer 100 needs to nullify that snapshot and obtain a new snapshot. Hereafter, this is referred to as deletion of the snapshot. For this purpose, the snapshot instruction program 127 issues a ModeSelect command to the disk array 200 to delete the snapshot (step 2001).

The snapshot management program 226 in the disk array 200 receives the ModeSelect command (step 3001). Based on the disk power supply control instruction included in the ModeSelect command, the snapshot management program 226 turns on the ATA disks 274 through 276 (step 3002). The disk power supply control instruction turns on the disk devices corresponding to the LU 262. According to the instruction, the disk array 200 locates ATA disks constituting the LU 262 from the disk management table 224 in FIG. 4 and turns on the ATA disks 274 through 276 in this embodiment. The LU mirror sub-program 228 is activated to restart duplication of the LU 261 and the LU 262 (step 3003). In this embodiment, the activation means starting or initiating a process or a program. The inactivation means terminating or stopping a process or a program. At step 3003, the LU 262 reflects the update to the LU 261.

The snapshot management program 226 inactivates the non-mirror update monitoring sub-program 230 and the non-mirror update position management sub-program 231 to stop recording updates to the LU 261 (step 3004). Thereafter, the update bit in the update position management table 232 is not changed by the non-mirror update position management sub-program 231.

The snapshot management program 226 then activates the mirror resynchronization sub-program 229. The mirror resynchronization sub-program 229 references the update position management table 232. When the LU 261 contains data that differs from data stored in the LU 262, the mirror resynchronization sub-program 229 copies that data from the LU 261 to the LU 262 to resume the mirror state between the LU 261 and LU 262 (step 3005). This is also referred to as resynchronization.

Upon completion of the resynchronization, the snapshot management program 226 inactivates the mirror resynchronization sub-program 229 (step 3006). The snapshot management program 226 sends the termination status of the ModeSelect command to the snapshot instruction program 127 on the computer 100 (step 3007). The snapshot instruction program 127 receives the termination status of the ModeSelect command to terminate the operation (step 2002).

The snapshot instruction program 127 on the computer 100 then issues a ModeSelect command to obtain a snapshot on the disk array 200 (step 2003).

The snapshot management program 226 on the disk array 200 receives th ModeSelect (step 3008). The snapshot management program 226 activates the non-mirror update monitoring sub-program 230 and the non-mirror update position management sub-program 231 to allow the update position management table 232 to record the position information about the data update applied to the LU 261 (step 3009). That is to say, when the LU 261 is updated, the update position management table 232 indicates the update bit set to 1 for the LBA set including the updated LBA to record the update.

The snapshot management program 226 then inactivates the LU mirror sub-program 228 to stop duplication of the LU 261 and the LU 262 (step 3010). This prevents the LU 262 as the mirror destination LU from reflecting the update to the LU 261 as the mirror origin LU.

The snapshot management program 226 then sends the termination status of the ModeSelect command to the snapshot instruction program 127 on the computer 100 (step 3011).

The snapshot instruction program 127 on the computer 100 receives the termination status of the ModeSelect command from the snapshot management program 226 (step 2004). The snapshot instruction program 127 supplies the backup server 400 with an instruction to obtain a backup via the communication I/F 160. The backup server 400 receives the termination report (step 2005). The snapshot instruction program 127 then issues a ModeSelect command to turn off the ATA disks 274 through 276 to the snapshot management program 226 (step 2006). The procedure to turn off the ATA disks 274 through 276 is the same as that at step 3002.

When receiving the ModeSelect command, the snapshot management program 226 in the disk array 200 turns off the ATA disks 274 through 276 according to the disk power supply control instruction contained in the ModeSelect command (step 3012).

There have been described the operations of the snapshot instruction program 127 and the snapshot management program 226 when snapshots are obtained or deleted.

(3) Write Operation

The following describes a write operation of the RAID control program 221 in the disk array 200. When the computer 100 writes data to the LU 261 to update the contents stored in the LU 261, the snapshot management program 226 receives a WRITE command and data issued to the LU 261.

Let us assume that the LU mirror sub-program 231 is active and that the non-mirror update monitoring sub-program 230 and the non-mirror update position management sub-program 231 are inactive. When receiving write data from the computer 100, the snapshot management program 226 writes the write data to both the LU 261 as the mirror origin LU and the LU 262 as the mirror destination LU.

Let us assume that the LU mirror sub-program 231 is inactive and the non-mirror update monitoring sub-program 230 and the non-mirror update position management sub-program are active. In this case, the snapshot management program 226 writes data to the LU 261 as the mirror origin LU. While the update position management table 232 records update positions, the snapshot management program 226 allows this table to set the update bit to 1 for the LBA set including the updated LBA.

Finally, the status is sent to the computer 100.

(4) Mirror Resynchronization

Figure 7:
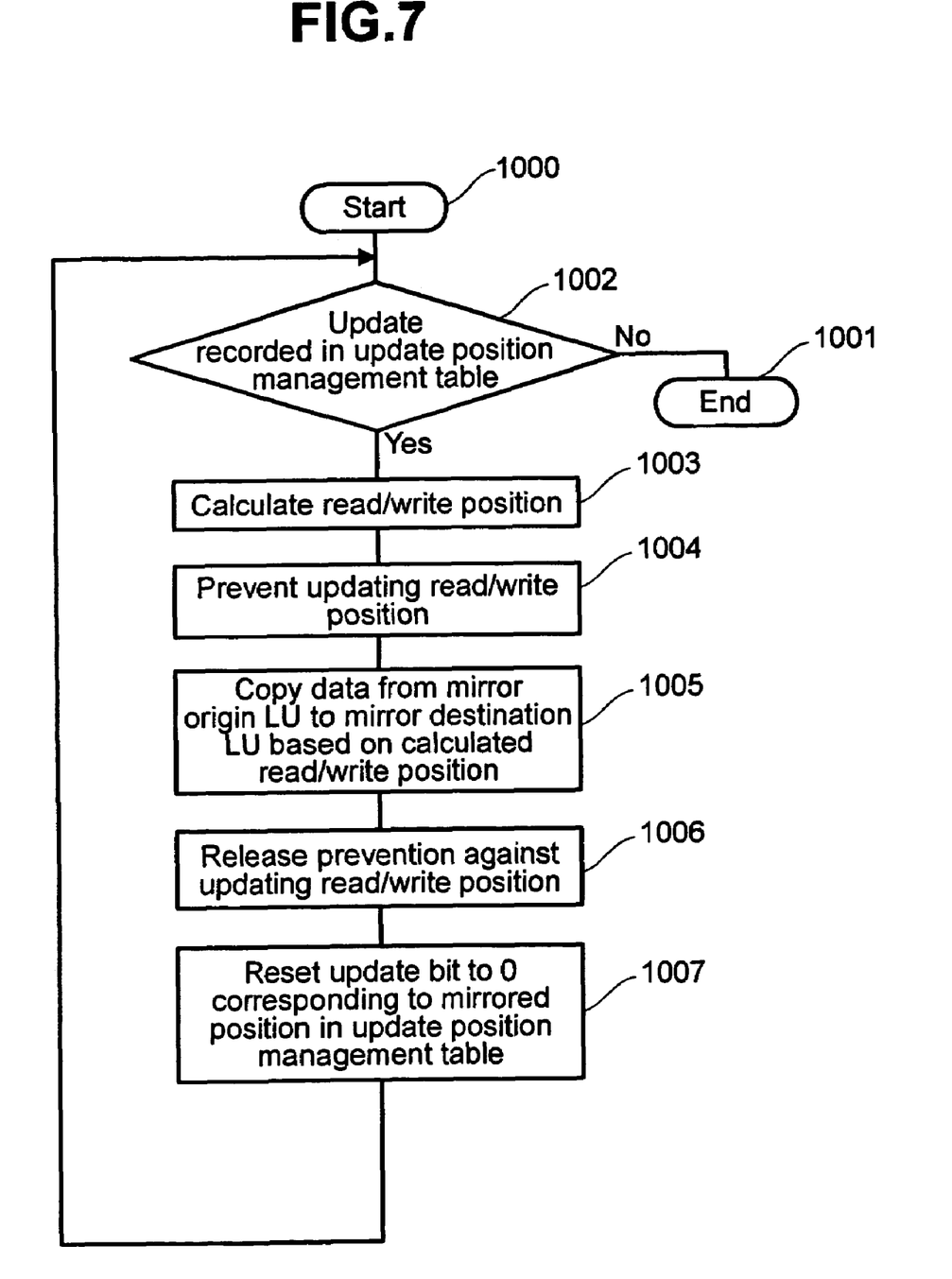
FIG. 7 shows a process example of a mirror resynchronization program according to the first embodiment.

The following describes an example of the mirror resynchronization to copy data from the LU 261 to the LU 262 at step 3003 in FIG. 6. FIG. 7 exemplifies an operation of the mirror resynchronization sub-program 229 during mirror resynchronization. The mirror resynchronization sub-program 229 checks whether or not the update position management table 232 contains the update bit set to 1 to record the update (step 1001). When there is no update bit set to 1 to record the update, the mirror resynchronization is complete. The mirror resynchronization sub-program 229 terminates the process (step 1002).

When there is an update record, the mirror resynchronization sub-program 229 references the update position management table 232. Based on the LBA set number corresponding to the update bit set to 1, the mirror resynchronization sub-program 229 calculates a read position on the LU 261 and a write position on the LU 262 (step 1003).

The mirror resynchronization sub-program 229 prevents data from being updated to the corresponding read/write position (step 1004). Based on the calculated read/write position, the mirror resynchronization sub-program 229 copies the data stored at the read position in the LU 261 as the mirror origin LU to the write position in th LU 262 as the mirror destination LU (step 1005). It should be noted that preventing the update is equivalent to inhibiting writing. The update is prevented to ensure the consistency of data between the LU 261 and the LU 262 after the mirror resynchronization.

The mirror resynchronization sub-program 229 then releases the prevention against updating data at the corresponding read/write position (step 1006). The mirror resynchronization sub-program 229 sets 0 to the update bit in the update position management table 232 correspondingly to the mirrored position due to the copy at step 1005 (step 1007), and then returns to step 1001.

There has been described the mirror resynchronization.

(5) Disk Operation Time Management

Using the input section 610 of the management terminal 600, a user can set the life of each of the FC disks 271 through 273 and the ATA disks 274 through 276 in the disk management table 224. The life signifies a product cycle estimated from the disk design specifications of the disk device, or a warranty period, or an accumulated operation time over which the disk is highly possibly subject to errors. It is assumed to find an accumulated time by totaling the time during which the disk device is turned on. When the accumulated time exceeds the life, there is a high possibility of causing an error.

The disk management program 222 records the disk device's accumulated time in the disk management table 224. The disk management program 222 counts the time during which the FC disks 271 through 273 and the ATA disks 274 through 276 are turned on. The disk management program 222 records the counted time as the accumulated time in the disk management table 224. The disk management program 222 compares the life of each of the FC disks 271 through 273 and the ATA disks 274 through 276 with the accumulated time. When the accumulated time exceeds the life, the disk management program 222 displays an alarm on the output section 620 of the management terminal 600.

According to the first embodiment as mentioned above, the snapshot management program obtains a snapshot of the LU 262 in synchronization with the timing when the backup server obtains a backup. It is possible to turn on the ATA disk device storing the snapshot data only when the snapshot management program obtains a snapshot and backs it up on the tape. In other words, the disk device can be turned off while no backup is created. This can extend the operation period of disk devices in the disk array 200 and decrease the power consumption of the disk array 200.

The disk array 200 receives the ModeSelect command issued from the computer 100. At this time, the disk controller 250 controls turning on or off the disk device. While the disk device is turned off, the computer 200 does not access the disk device. This can prevent a time-out condition of access requests from the computer 200.

Second Embodiment

The second embodiment will now be described.

(1) Description of the System Configuration

Figure 8:
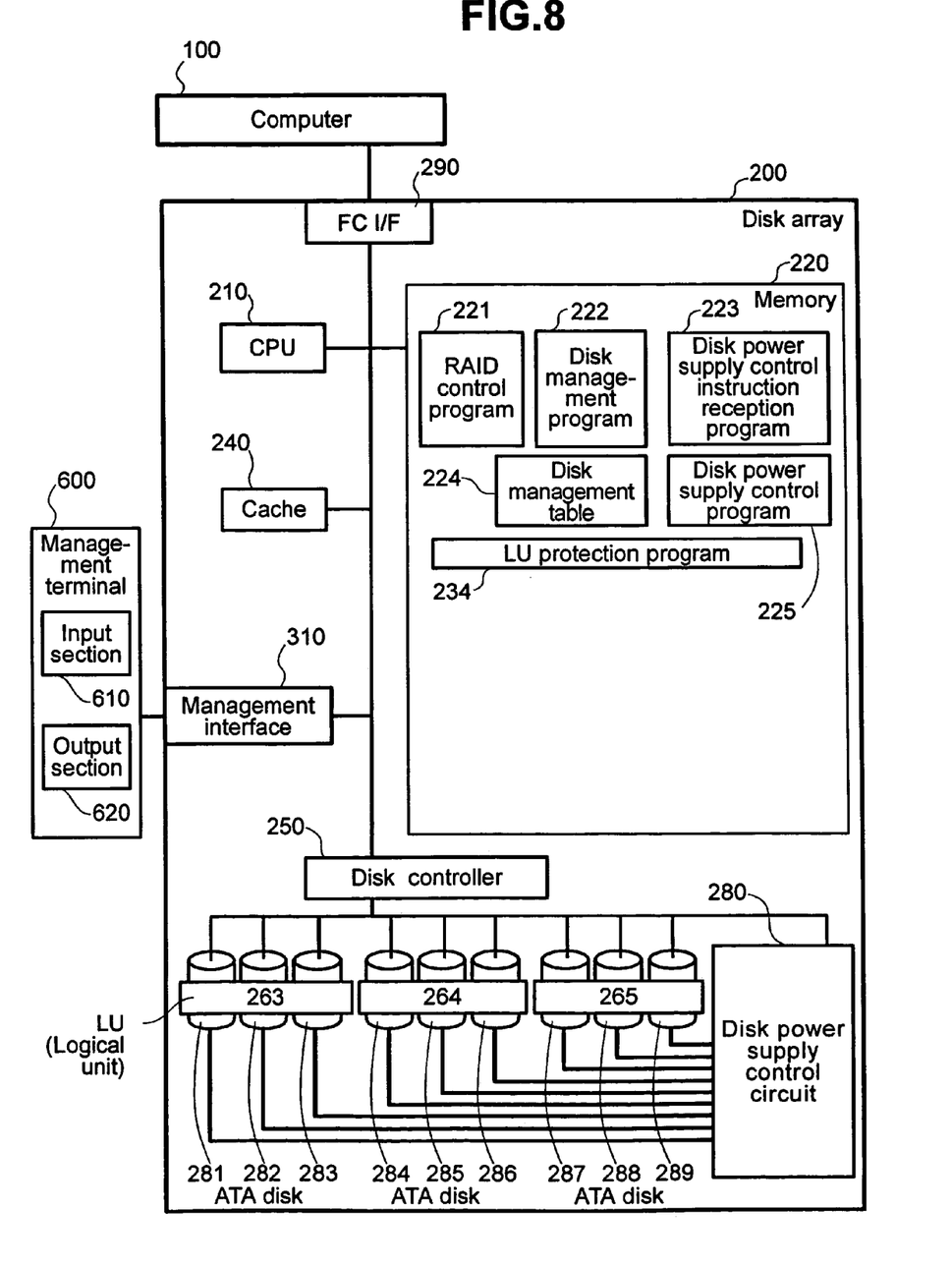
FIG. 8 shows an example of a system configuration according to a second embodiment.

FIG. 8 shows an example of the system configuration according to the second embodiment. The following describes only differences from the first embodiment. Unlike the example in FIG. 1, the system in FIG. 8 uses entirely ATA disks 281 through 289 connected to the disk controller 250. The computer 100 accesses a storage area in the ATA disks 281 through 283 as a SCSI LU. Likewise, the computer 100 accesses a storage area in the ATA disks 284 through 286 as another SCSI LU. The computer 100 accesses a storage area in the ATA disks 287 through 289 as yet another SCSI LU. The LU in the ATA disks 281 through 283 is defined as an LU 263. The LU in the ATA disks 284 through 286 is defined as an LU 264. The LU in the ATA disks 287 through 289 is defined as an LU 265. FIG. 8 shows that each of the LU 263, the LU 264, and the LU 265 constitutes a storage area extending to a plurality of disks. Each LU may comprise a storage area in one disk. According to an instruction from the disk power supply control program 225, the disk power supply control circuit 280 turns on or off the ATA disks 281 through 289 independently of the other ATA disks.

The memory 220 stores an LU protection program 234 that protects the LUs against reading or writing instead of the snapshot management program 226.

Unlike the example in FIG. 4, the disk management table 224 according to the second embodiment does not record the snapshot pair or the snapshot status.

Figure 9:
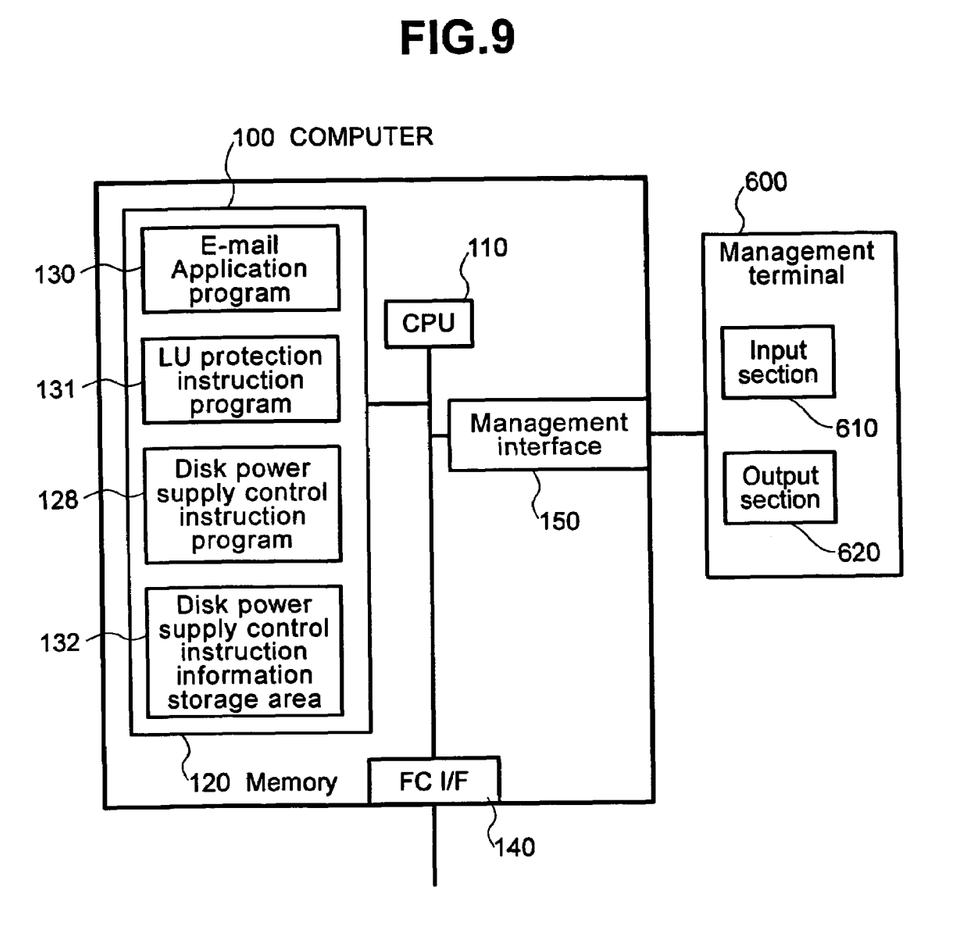
FIG. 9 shows an example of a computer configuration according to the second embodiment.

FIG. 9 shows an example of the computer 100 according to the second embodiment. Unlike the example in FIG. 2, the computer 100 contains an E-mail application program 130, an LU protection instruction program 131, and a disk power supply control instruction information storage area 132 instead of the database program 126 and the snapshot instruction program 127. The LU protection instruction program 131 instructs protection against reading or writing to the LUs. The E-mail application stores electronic mail archives in the memory 120, sequentially writes data, and stores data at consecutive addresses. This embodiment will be described using the E-mail application as an example. The E-mail application specifies a sequence of LUs to be written. According to the embodiment, the E-mail application accesses the LU 263, LU 264, and LU 265 in this order at scheduled times to write data. The embodiment is not limited to the E-mail application.

Figure 10:
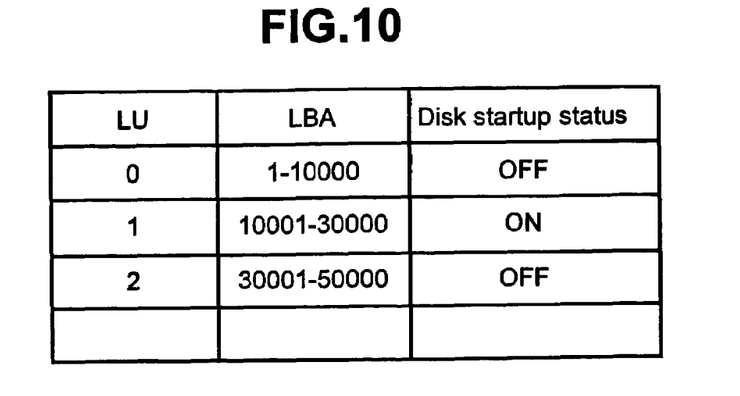
FIG. 10 shows an example of an address map according to the second embodiment.

The disk power supply control instruction information storage area 132 stores an address map as shown in FIG. 10. The address map lists LU numbers, LBA numbers, and disk startup status of disk devices constituting LUs. The disk startup status provides information about power-on/off states of the disk devices.

The computer further contains a management I/F 150 that is connected to the management terminal 600.

There has been described the system configuration according to the second embodiment.

(2) Operation of the Disk Power Supply Control Instruction Program

The E-mail application 130 issues a request to write data to the disk array 200 for sequential access. Based on this request, the disk power supply control instruction program 128 in the computer 100 references the address map in FIG. 10. The disk power supply control instruction program 128 issues an instruction to turn on disk devices belonging to the LU corresponding to the address for writing. The disk power supply control instruction program 128 issues an instruction to turn off disk devices belonging to the LU corresponding to the address for which the writing is complete. When reading data, a user uses the input section 610 of the management terminal 600 to issue an instruction to turn on disk devices belonging to the LU that stores data to be read.

Figure 11:
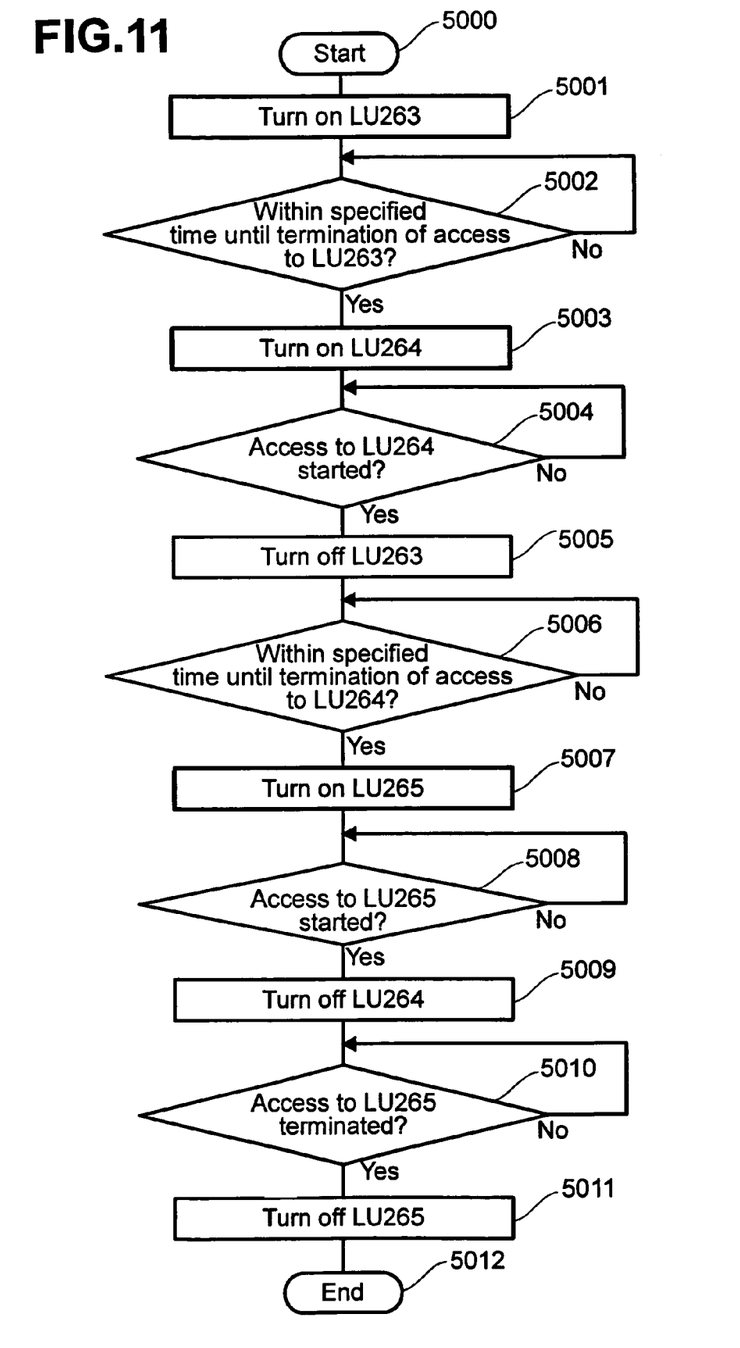
FIG. 11 shows a process example of a disk power supply control instruction program according to the second embodiment.

FIG. 11 is a flowchart showing an operation example of the disk power supply control instruction program 128 in the E-mail application. Let us assume that the E-mail application 130 makes preparations for writing to the LU 263. Based on an request from the E-mail application 130 to write to the disk array 200, the disk power supply control instruction program 128 instructs the disk array 200 to turn on the disks constituting the LU 263 (step 5001). The E-mail application 130 starts writing to the LU 263. The disk power supply control instruction program 128 then determines whether or not the remaining time is shorter than or equal to the specified time until the scheduled time of terminating the access to the LU 263 (step 5002). When the remaining time is longer than the specified time until the scheduled time of terminating the access, the disk power supply control instruction program 128 repeats the determination at step 5002. When the remaining time becomes shorter than the specified time, the disk power supply control instruction program 128 instructs the disk array 200 to turn on the LU 264 (step 5003). The disk power supply control instruction program 128 then determines whether or not the E-mail application 130 starts accessing the LU 264 (step 5004). When the E-mail application 130 does not start accessing the LU 264, the disk power supply control instruction program 128 repeats the determination at step 5004. When the E-mail application 130 starts accessing the LU 264, the disk power supply control instruction program 128 instructs the disk array 200 to turn off the LU 263 that terminated the access from the E-mail application 130 (step 5005). The disk power supply control instruction program 128 then determines whether or not the remaining time is shorter than or equal to the specified time until the scheduled time of terminating the access to the LU 264 (step 5006). When the remaining time is longer than the specified time until the scheduled time of terminating the access, the disk power supply control instruction program 128 repeats the determination at step 5006. When the remaining time becomes shorter than the specified time, the disk power supply control instruction program 128 instructs the disk array 200 to turn on the LU 265 (step 5007). The disk power supply control instruction program 128 then determines whether or not the E-mail application 130 starts accessing the LU 265 (step 5008). When the E-mail application 130 does not start accessing the LU 265, the disk power supply control instruction program 128 repeats the determination at step 5008. When the E-mail application 130 starts accessing the LU 265, the disk power supply control instruction program 128 instructs the disk array 200 to turn off the LU 264 that terminated the access from the E-mail application 130 (step 5009). Finally, the disk power supply control instruction program 128 determines whether or not the access to the LU 265 terminates (step 5010). When the access does not terminate, the disk power supply control instruction program 128 repeats the determination at step 5010. When the access from the E-mail application 130 terminates, the disk power supply control instruction program 128 instructs the disk array 200 to turn off the LU 265 (step 5011). There has been described the operation of the disk power supply control instruction program 128. Like the first embodiment, the disk array 200 receives a disk power supply control instruction from the computer 100. The disk array 200 references the disk management table 224 to locate the disk device corresponding to the LU to be turned on or off and turns on or off the disk device.

It may be preferable to instruct the disk array 200 to turn on or off disk devices corresponding to the LU based on a user input. For example, the user may use the input section 610 of the management terminal 600 to issue an instruction to the LU protection instruction program 131 so as to protect an LU against reading or writing. In this case, the disk power supply control instruction program 128 instructs the disk power supply control program 225 of the disk array 200 to turn off disk devices belonging to the LU that is instructed to be protected. The user may use the input section 610 of the management terminal 600 to issue an instruction to the LU protection instruction program 131 so as to release the protection of an LU against reading or writing. In this case, the disk power supply control instruction program 128 instructs the disk power supply control program 225 of the disk array 200 to turn on disk devices belonging to the LU that is instructed to be unprotected.

The embodiment has been described using the E-mail application as an example. Consequently, the flowchart in FIG. 11 shows the operation of specifying the sequence of LUs for writing data and sequentially turning on or off the disk devices belonging to the LU at specified times. However, the embodiment is not limited to the E-mail application and is capable of turning on or off disk devices constituting the LU to be accessed for reading or writing.

The embodiment can operate only disk devices reading or writing data and stop the other disk devices not reading or writing data, making it possible to extend the disk array's operation period and decrease its power consumption.

The disk controller 250 controls turning on or off the disk devices in synchronization with the timing when the disk array 200 receives an instruction from the computer 100 to turn on or off the disk devices. While the disk device is turned off, the computer 200 does not access the disk device. This can prevent a time-out condition of access requests from the computer 200.

It is possible to extend the operation period and the total active time of the disk devices constituting the disk array and decrease the disk array's power consumption.

What is claimed is:

1. A computer system comprising:
   a storage system including a first disk device configuring a first logical unit, a second disk device configuring a second logical unit, and a controller for accessing to the first logical unit and the second logical unit; and
   a disk controller requesting an access to the first logical unit and the second logical unit and a disk power supply control circuit instructing the controller to turn on or off the first disk device configuring the first logical unit and the second disk device configuring the second logical unit,
   wherein after the disk power supply control circuit determines that the disk controller terminates requesting the access to the first logical unit, the disk power supply control circuit issues an instruction to turn off the first disk device configuring the first logical unit to the controller,
   wherein, based on the instruction, the controller turns off the first disk device configuring the first logical unit independently of the second disk device configuring the second logical unit,
   wherein the disk controller is configured to request an access to the second logical unit after a completion of accessing to the first logical unit,
   wherein the disk power supply control circuit determines whether or not remaining time until a scheduled time of terminating the access to the first logical unit is shorter than a predetermined time, and
   wherein when the remaining time becomes shorter than a predetermined time, the disk power supply control circuit instructs the controller to turn on the second disk device configuring the second logical unit.

2. A computer system of claim 1,
   wherein when the disk power supply control circuit determines that the first logical unit is to be accessed by the disk controller, the disk power supply control circuit instructs the controller to turn on the first disk device configuring the first logical unit, and
   wherein after the disk power supply control circuit instructs the controller to turn on the first disk device configuring the first logical unit, the disk controller starts accessing to the first logical unit.

3. A computer system of claim 1,
   wherein the disk controller is configured to request an access to the second logical unit after a completion of accessing to the first logical unit,
   wherein the disk power supply control circuit determines whether or not the disk controller starts accessing to the second logical unit, and
   wherein when the disk controller starts accessing to the second logical unit, the disk power supply control circuit instructs the controller to turn off the first disk device configuring the first logical unit.

4. A computer system of claim 3,
   wherein the disk power supply control circuit determines whether or not the access to the second logical unit terminates, and
   wherein when the access from the disk controller to the second logical unit terminates, the disk power supply control circuit instructs the controller to turn off the second disk device configuring the second logical unit.

5. In a method used in a computer system which comprises:
   a storage system including a first disk device configuring a first logical unit, a second disk device configuring a second logical unit, and a controller for accessing to the first logical unit and the second logical unit; and
   a disk controller requesting an access to the first logical unit and the second logical unit and a disk power supply control circuit instructing the controller to turn on or off the first disk device configuring the first logical unit and the second disk device configuring the second logical unit,
   the method comprising steps of:
   issuing an instruction to turn off the first disk device configuring the first logical unit to the controller by the disk power supply control circuit, after the disk power supply control circuit determines that the disk controller terminates requesting the access to the first logical unit; and
   turning off the first disk device configuring the first logical unit independently of the second disk device configuring the second logical unit based on the instruction by the controller;
   wherein the disk controller is configured to request an access to the second logical unit after a completion of accessing to the first logical unit, and
   the method further comprising steps of:
   determining by the disk power supply control circuit whether or not the remaining time until a scheduled time of terminating the access to the first logical unit is shorter than a predetermined time; and
   instructing the controller to turn on the second disk device configuring the second logical unit, when the remaining time becomes shorter than a predetermined time.

6. A method of claim 5, further comprising steps of:
   instructing the controller to turn on the first disk device configuring the first logical unit by the disk power supply control circuit, when the disk power supply control circuit determines that the first logical unit is to be accessed by the disk controller; and
   starting accessing to the first logical unit by the disk controller after the disk power supply control circuit instructs the controller to turn on the first disk device configuring the first logical unit.

7. A method of claim 5, wherein the disk controller is configured to request an access to the second logical unit after a completion of accessing to the first logical unit, and
   the method further comprising steps of:
   determining by the disk power supply control circuit whether or not the disk controller starts accessing to the second logical unit; and
   instructing the controller to turn off the first disk device configuring the first logical unit by the disk controller when the disk controller starts accessing to the second logical unit.

8. A method of claim 7, further comprising steps of:
   determining by the disk power supply control circuit whether or not the access to the second logical unit terminates, and instructing the controller to turn off the second disk device configuring the second logical unit when the access from the disk controller to the second logical unit terminates.

9. A computer program product used in a computer system, wherein the computer system includes:
- a storage system including a first disk device configuring a first logical unit, a second disk device configuring a second logical unit, and a controller for accessing to the first logical unit and the second logical unit; and
- a disk controller accessing to the first logical unit and second logical unit, the computer program product comprising:
- a recording medium;
- a disk controller means, recorded on the recording medium, for requesting an access to the first logical unit and the second logical unit; and
- a disk power supply control means, recorded on the recording medium, for instructing the controller to turn on or off the first disk device configuring the first logical unit and the second disk device configuring the second logical unit,
- wherein after the disk power supply control means determines that the disk controller means terminates requesting the access to the fist logical unit, the disk power supply control means issues an instruction to turn off the first disk device configuring the first logical unit to the controller,
- wherein, based on the instruction, the controller turns off the first disk device configuring the first logical unit independently of the second disk device configuring the second logical unit,
- wherein the disk controller means is configured to request an access to the second logical unit after a completion of accessing to the first logical unit,
- wherein the disk supply instruction means determines whether or not remaining time until a scheduled time of terminating the access to the first logical unit is shorter than a predetermined time, and
- wherein when the remaining time becomes shorter than a predetermined time, the disk power supply control means instructs the controller to turn on the second disk device configuring the second logical unit.

10. A computer program product of claim 9:
- wherein when the disk power supply control means determines that the first logical unit is to be accessed by the access request means, the disk power supply control means instructs the controller to turn on the first disk device configuring the first logical unit, and
- wherein after the disk power supply control means instructs the controller to turn on the first disk device configuring the first logical unit, the access request means starts accessing to the first logical unit.

11. A computer program product of claim 9,
- wherein the disk controller means is configured to request an access to the second logical unit after a completion of accessing to the first logical unit,
- wherein the disk power supply control means determines whether or not the disk controller means starts accessing to the second logical unit, and
- wherein when the disk controller means starts accessing to the second logical unit, the disk power supply control means instructs the controller to turn off the first disk device configuring the first logical unit.

12. A computer program product of claim 11,
- wherein the disk power supply control means determines whether or not the access to the second logical unit terminates, and
- wherein when the access from the disk controller means to the second logical unit terminates, the disk power supply control means instructs the controller to turn off the second disk device configuring the second logical unit.

* * * * *